(12) United States Patent
Hamedi et al.

(10) Patent No.: US 11,663,811 B2
(45) Date of Patent: *May 30, 2023

(54) SYSTEMS, METHODS, AND STORAGE MEDIA FOR EVALUATING IMAGES

(71) Applicant: VIZIT LABS, INC., Boston, MA (US)

(72) Inventors: Jehan Hamedi, South Boston, MA (US); Zachary Halloran, Braintree, MA (US); Elham Saraee, Jamaica Plain, MA (US)

(73) Assignee: Vizit Labs, Inc., Boston, MA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/466,820

(22) Filed: Sep. 3, 2021

(65) Prior Publication Data

US 2022/0058434 A1 Feb. 24, 2022

Related U.S. Application Data

(60) Continuation of application No. 16/672,227, filed on Nov. 1, 2019, now Pat. No. 11,113,572, which is a division of application No. 16/271,780, filed on Feb. 8, 2019, now Pat. No. 10,467,504.

(51) Int. Cl.
*G06V 10/74* (2022.01)
*G06V 10/82* (2022.01)
*G06F 18/214* (2023.01)
*G06F 18/22* (2023.01)

(52) U.S. Cl.
CPC .......... *G06V 10/761* (2022.01); *G06F 18/214* (2023.01); *G06F 18/22* (2023.01); *G06V 10/82* (2022.01)

(58) Field of Classification Search
CPC .... G06V 10/761; G06V 10/82; G06F 18/214; G06F 18/22
See application file for complete search history.

(56) References Cited

U.S. PATENT DOCUMENTS

| | | | |
|---|---|---|---|
| 8,073,253 B2 * | 12/2011 | Li | ............... G06T 7/149 382/173 |
| 9,996,890 B1 | 6/2018 | Cinnamon et al. | |
| 10,049,308 B1 * | 8/2018 | Dhua | ............... G06T 7/155 |
| 10,176,198 B1 | 1/2019 | Dhua et al. | |

(Continued)

*Primary Examiner* — Ming Y Hon
(74) *Attorney, Agent, or Firm* — Foley & Lardner LLP

(57) ABSTRACT

Embodiments may: select a set of training images; extract a first set of features from each training image of the set of training images to generate a first feature tensor for each training image; extract a second set of features from each training image to generate a second feature tensor for each training image; reduce a dimensionality of each first feature tensor to generate a first modified feature tensor for each training image; reduce a dimensionality of each second feature tensor to generate a second modified feature tensor for each training image; construct a first generative model representing the first set of features and a second generative model representing the second set of features of the set of training images; identify a first candidate image; and apply a regression algorithm to the first candidate image and each of the first generative model and the second generative model to determine whether the first candidate image is similar to the set of training images.

20 Claims, 8 Drawing Sheets

(56) References Cited

U.S. PATENT DOCUMENTS

| | | |
|---|---|---|
| 10,410,108 B2 | 9/2019 | Shaji et al. |
| 10,467,504 B1* | 11/2019 | Hamedi .................. G06F 18/22 |
| 10,732,783 B2 | 8/2020 | Yang et al. |
| 10,861,077 B1 | 12/2020 | Liu et al. |
| 2003/0021481 A1 | 1/2003 | Kasutani |
| 2005/0123202 A1 | 6/2005 | Hwang et al. |
| 2016/0063205 A1* | 3/2016 | Moturu .................. G16H 40/67 705/3 |
| 2016/0098844 A1 | 4/2016 | Shaji et al. |
| 2016/0280268 A1 | 9/2016 | Hassani et al. |
| 2016/0300125 A1* | 10/2016 | Barker ................. G06V 10/454 |
| 2016/0335120 A1 | 11/2016 | Gupta et al. |
| 2017/0024761 A1 | 1/2017 | Ruiz et al. |
| 2017/0100078 A1* | 4/2017 | Han ..................... A61N 5/1039 |
| 2018/0039879 A1 | 2/2018 | Shaji et al. |
| 2018/0061051 A1 | 3/2018 | Matsunaga |
| 2018/0157838 A1* | 6/2018 | Bushey .................. G06N 20/00 |
| 2018/0174190 A1 | 6/2018 | Ferreira et al. |
| 2018/0189609 A1 | 7/2018 | Park et al. |
| 2019/0026609 A1 | 1/2019 | Shen et al. |
| 2019/0080176 A1 | 3/2019 | Lan et al. |
| 2019/0080456 A1 | 3/2019 | Song et al. |
| 2019/0147340 A1 | 5/2019 | Zhang et al. |
| 2019/0180109 A1 | 6/2019 | Sinha et al. |
| 2019/0245925 A1 | 8/2019 | Yamamoto |
| 2020/0050831 A1 | 2/2020 | Rogan et al. |
| 2020/0111022 A1 | 4/2020 | Silberman et al. |
| 2021/0182613 A1 | 6/2021 | Zhang et al. |
| 2021/0264161 A1 | 8/2021 | Saraee et al. |
| 2021/0350284 A1 | 11/2021 | Agrawal et al. |
| 2022/0012471 A1 | 1/2022 | Yuan et al. |
| 2022/0249175 A1 | 8/2022 | Tolkowsky |
| 2022/0335256 A1 | 10/2022 | Saraee et al. |

\* cited by examiner

SYSTEMS, METHODS, AND STORAGE MEDIA FOR EVALUATING IMAGES

CROSS-REFERENCE TO RELATED APPLICATION

This application claims priority as a continuation to U.S. patent application Ser. No. 16/672,227, titled "SYSTEMS, METHODS, AND STORAGE MEDIA FOR EVALUATING IMAGES" and filed on Nov. 1, 2019, which claims priority as a divisional to U.S. patent application Ser. No. 16/271,780, titled "SYSTEMS, METHODS, AND STORAGE MEDIA FOR EVALUATING IMAGES" and filed on Feb. 8, 2019, each of which is hereby incorporated by reference in its entirety.

FIELD OF THE DISCLOSURE

The present disclosure relates to systems, methods, and storage media for evaluating images.

BACKGROUND

Many people use the internet every day. Some use it to discover information such as news, recipes, phone numbers, etc. Some use the internet to communicate with others through mediums such as chat rooms, message boards, and e-mail. Traffic on the internet is large and many people use the internet for extended amounts of time.

Users of the internet may also use the internet to such a degree that advertisers can effectively market goods and services to customers or potential customers using the internet. For example, a host or administrator of a website may place advertisements on popular pages of their website. Such advertisements may be related to other parts of the website or goods that can be purchased that are related to the website. In another example, such advertisements can be unrelated to the website. For example, the website host or administrator may sell space to advertise on and within the website to third parties, much like a billboard might sell or lease ad space to third parties who would like passersby to see the advertisement.

SUMMARY

One aspect of the present disclosure relates to a system configured for evaluating images. The system may include one or more hardware processors configured by machine-readable instructions. The processor(s) may be configured to select a set of training images. The processor(s) may be configured to extract a first set of features from each training image of the set of training images to generate a first feature tensor for each training image. The processor(s) may be configured to extract a second set of features from each training image to generate a second feature tensor for each training image. The processor(s) may be configured to reduce a dimensionality of each first feature tensor to generate a first modified feature tensor for each training image. The processor(s) may be configured to reduce a dimensionality of each second feature tensor to generate a second modified feature tensor for each training image. The processor(s) may be configured to construct a first generative model representing the first set of features and a second generative model representing the second set of features of the set of training images, based on the first modified feature tensors and the second modified feature tensors of each training image of the set of training images. The processor(s) may be configured to identify a first candidate image. The processor(s) may be configured to apply a regression algorithm to the first candidate image and each of the first generative model and the second generative model to determine whether the first candidate image is similar to the set of training images.

In some implementations of the system, the processor(s) may be configured to calculate a similarity score representing a degree of visual similarity between the first candidate image and the set of training images, based on the regression algorithm.

In some implementations of the system, the processor(s) may be configured to calculate a uniqueness score of the first candidate image with respect to the set of training images.

In some implementations of the system, calculating the uniqueness score of the first candidate image may include calculating an inverse of the similarity score. In some implementations of the system, calculating the uniqueness score of the first candidate image may include identifying the inverse as the uniqueness score.

In some implementations of the system, the processor(s) may be configured to extract features from the first candidate image to generate a candidate image feature tensor. In some implementations of the system, the features may correspond to the first set of features extracted from each candidate image. In some implementations of the system, the processor(s) may be configured to reduce a dimensionality of the candidate image feature tensor to generate a modified candidate image feature tensor. In some implementations of the system, determining whether the candidate image may be similar to the set of training images includes comparing the modified candidate image feature tensor with the first generative model.

In some implementations of the system, the processor(s) may be configured to apply a weight to the features extracted from the candidate image to generate a set of weighted candidate image features. In some implementations of the system, the candidate image feature tensor may be generated based on the set of weighted candidate image features.

In some implementations of the system, the first set of features extracted from each training image may include object features. In some implementations of the system, the processor(s) may be configured to extract the first set of features from each training image by propagating data corresponding to each training image through at least one network including at least one of an object detection neural network, an object classification neural network, or an object recognition neural network. In some implementations of the system, the network may include an input layer, a plurality of intermediate layers, and an output layer. In some implementations of the system, the processor(s) may be configured to extract the first set of features from each training image by extracting outputs from at least one of the plurality of intermediate layers of the network.

In some implementations of the system, extracting the first set of features from each training image may include extracting at least one of a set of object features, a set of scene features, a set of intensity features, a set of contrast features, a set of color features, and a set of blurriness features from each training image.

In some implementations of the system, the processor(s) may be configured to identify respective locations of the first feature tensor and the second feature tensor in a feature space defined by the first set of features and the second set of features. In some implementations of the system, the processor(s) may be configured to generate a visual signature for the set of training images based on the respective locations of the first feature tensor and the second feature tensor.

In some implementations of the system, the processor(s) may be configured to select the set of training images based on at least one of a common author, a common origin, or a common theme.

In some implementations of the system, the processor(s) may be configured to identify a set of candidate images including the first candidate image. In some implementations of the system, the processor(s) may be configured to determine, for each candidate image of the set of candidate images, whether the candidate image is similar to the set of training images based on the first candidate image and each of the first generative model and the second generative model. In some implementations of the system, the processor(s) may be configured to identify a subset of the set of candidate images that are similar to the set of training images.

In some implementations of the system, the processor(s) may be configured to provide a graphical user interface to be displayed on a computing device. In some implementations of the system, the graphical user interface may display a plurality of indications corresponding to the set of candidate images. In some implementations of the system, the processor(s) may be configured to receive a user selection of a first indication or the plurality of indications corresponding to the first candidate image.

In some implementations of the system, the processor(s) may be configured to identify a brand attribute. In some implementations of the system, the processor(s) may be configured to select the first set of features to be extracted from the set of training images based at least in part on the brand attribute.

In some implementations of the system, reducing the dimensionality of each first feature tensor may include applying principal component analysis to each first feature tensor to generate a first modified feature tensor for each training image.

Another aspect of the present disclosure relates to a method for evaluating images. The method may include selecting a set of training images. The method may include extracting a first set of features from each training image of the set of training images to generate a first feature tensor for each training image. The method may include extracting a second set of features from each training image to generate a second feature tensor for each training image. The method may include reducing a dimensionality of each first feature tensor to generate a first modified feature tensor for each training image. The method may include reducing a dimensionality of each second feature tensor to generate a second modified feature tensor for each training image. The method may include constructing a first generative model representing the first set of features and a second generative model representing the second set of features of the set of training images, based on the first modified feature tensors and the second modified feature tensors of each training image of the set of training images. The method may include identifying a first candidate image. The method may include applying a regression algorithm to the first candidate image and each of the first generative model and the second generative model to determine whether the first candidate image is similar to the set of training images.

In some implementations of the method, it may include calculating a similarity score representing a degree of visual similarity between the first candidate image and the set of training images, based on the regression algorithm.

In some implementations of the method, it may include calculating a uniqueness score of the first candidate image with respect to the set of training images.

In some implementations of the method, calculating the uniqueness score of the first candidate image may include calculating an inverse of the similarity score. In some implementations of the method, calculating the uniqueness score of the first candidate image may include identifying the inverse as the uniqueness score.

In some implementations of the method, it may include extracting features from the first candidate image to generate a candidate image feature tensor. In some implementations of the method, the features may correspond to the first set of features extracted from each candidate image. In some implementations of the method, it may include reducing a dimensionality of the candidate image feature tensor to generate a modified candidate image feature tensor. In some implementations of the method, determining whether the candidate image may be similar to the set of training images includes comparing the modified candidate image feature tensor with the first generative model.

In some implementations of the method, it may include applying a weight to the features extracted from the candidate image to generate a set of weighted candidate image features. In some implementations of the method, the candidate image feature tensor may be generated based on the set of weighted candidate image features.

In some implementations of the method, the first set of features extracted from each training image may include object features. In some implementations of the method, it may include extracting the first set of features from each training image by propagating data corresponding to each training image through at least one network including at least one of an object detection neural network, an object classification neural network, or an object recognition neural network. In some implementations of the method, the network may include an input layer, a plurality of intermediate layers, and an output layer. In some implementations of the method, it may include extracting the first set of features from each training image by extracting outputs from at least one of the plurality of intermediate layers of the network.

In some implementations of the method, extracting the first set of features from each training image may include extracting at least one of a set of object features, a set of scene features, a set of intensity features, a set of contrast features, a set of color features, and a set of blurriness features from each training image.

In some implementations of the method, it may include identifying respective locations of the first feature tensor and the second feature tensor in a feature space defined by the first set of features and the second set of features. In some implementations of the method, it may include generating a visual signature for the set of training images based on the respective locations of the first feature tensor and the second feature tensor.

In some implementations of the method, it may include selecting the set of training images based on at least one of a common author, a common origin, or a common theme.

In some implementations of the method, it may include identifying a set of candidate images including the first candidate image. In some implementations of the method, it may include determining, for each candidate image of the set of candidate images, whether the candidate image is similar to the set of training images based on the first candidate image and each of the first generative model and the second generative model. In some implementations of the method, it may include identifying a subset of the set of candidate images that are similar to the set of training images.

In some implementations of the method, it may include providing a graphical user interface to be displayed on a computing device. In some implementations of the method, the graphical user interface may display a plurality of indications corresponding to the set of candidate images. In some implementations of the method, it may include receiving a user selection of a first indication or the plurality of indications corresponding to the first candidate image.

In some implementations of the method, it may include identifying a brand attribute. In some implementations of the method, it may include selecting the first set of features to be extracted from the set of training images based at least in part on the brand attribute.

In some implementations of the method, reducing the dimensionality of each first feature tensor may include applying principal component analysis to each first feature tensor to generate a first modified feature tensor for each training image.

Yet another aspect of the present disclosure relates to a non-transient computer-readable storage medium having instructions embodied thereon, the instructions being executable by one or more processors to perform a method for evaluating images. The method may include selecting a set of training images. The method may include extracting a first set of features from each training image of the set of training images to generate a first feature tensor for each training image. The method may include extracting a second set of features from each training image to generate a second feature tensor for each training image. The method may include reducing a dimensionality of each first feature tensor to generate a first modified feature tensor for each training image. The method may include reducing a dimensionality of each second feature tensor to generate a second modified feature tensor for each training image. The method may include constructing a first generative model representing the first set of features and a second generative model representing the second set of features of the set of training images, based on the first modified feature tensors and the second modified feature tensors of each training image of the set of training images. The method may include identifying a first candidate image. The method may include applying a regression algorithm to the first candidate image and each of the first generative model and the second generative model to determine whether the first candidate image is similar to the set of training images.

In some implementations of the computer-readable storage medium, the method may include calculating a similarity score representing a degree of visual similarity between the first candidate image and the set of training images, based on the regression algorithm.

In some implementations of the computer-readable storage medium, the method may include calculating a uniqueness score of the first candidate image with respect to the set of training images.

In some implementations of the computer-readable storage medium, calculating the uniqueness score of the first candidate image may include calculating an inverse of the similarity score. In some implementations of the computer-readable storage medium, calculating the uniqueness score of the first candidate image may include identifying the inverse as the uniqueness score.

In some implementations of the computer-readable storage medium, the method may include extracting features from the first candidate image to generate a candidate image feature tensor. In some implementations of the computer-readable storage medium, the features may correspond to the first set of features extracted from each candidate image. In some implementations of the computer-readable storage medium, the method may include reducing a dimensionality of the candidate image feature tensor to generate a modified candidate image feature tensor. In some implementations of the computer-readable storage medium, determining whether the candidate image may be similar to the set of training images includes comparing the modified candidate image feature tensor with the first generative model.

In some implementations of the computer-readable storage medium, the method may include applying a weight to the features extracted from the candidate image to generate a set of weighted candidate image features. In some implementations of the computer-readable storage medium, the candidate image feature tensor may be generated based on the set of weighted candidate image features.

In some implementations of the computer-readable storage medium, the first set of features extracted from each training image may include object features. In some implementations of the computer-readable storage medium, the method may include extracting the first set of features from each training image by propagating data corresponding to each training image through at least one network including at least one of an object detection neural network, an object classification neural network, or an object recognition neural network. In some implementations of the computer-readable storage medium, the network may include an input layer, a plurality of intermediate layers, and an output layer. In some implementations of the computer-readable storage medium, the method may include extracting the first set of features from each training image by extracting outputs from at least one of the plurality of intermediate layers of the network.

In some implementations of the computer-readable storage medium, extracting the first set of features from each training image may include extracting at least one of a set of object features, a set of scene features, a set of intensity features, a set of contrast features, a set of color features, and a set of blurriness features from each training image.

In some implementations of the computer-readable storage medium, the method may include identifying respective locations of the first feature tensor and the second feature tensor in a feature space defined by the first set of features and the second set of features. In some implementations of the computer-readable storage medium, the method may include generating a visual signature for the set of training images based on the respective locations of the first feature tensor and the second feature tensor.

In some implementations of the computer-readable storage medium, the method may include selecting the set of training images based on at least one of a common author, a common origin, or a common theme.

In some implementations of the computer-readable storage medium, the method may include identifying a set of candidate images including the first candidate image. In some implementations of the computer-readable storage medium, the method may include determining, for each candidate image of the set of candidate images, whether the candidate image is similar to the set of training images based on the first candidate image and each of the first generative model and the second generative model. In some implementations of the computer-readable storage medium, the method may include identifying a subset of the set of candidate images that are similar to the set of training images.

In some implementations of the computer-readable storage medium, the method may include providing a graphical user interface to be displayed on a computing device. In some implementations of the computer-readable storage medium, the graphical user interface may display a plurality of indications corresponding to the set of candidate images. In some implementations of the computer-readable storage medium, the method may include receiving a user selection of a first indication or the plurality of indications corresponding to the first candidate image.

In some implementations of the computer-readable storage medium, the method may include identifying a brand attribute. In some implementations of the computer-readable storage medium, the method may include selecting the first set of features to be extracted from the set of training images based at least in part on the brand attribute.

In some implementations of the computer-readable storage medium, reducing the dimensionality of each first feature tensor may include applying principal component analysis to each first feature tensor to generate a first modified feature tensor for each training image.

Yet another aspect of the present disclosure relates to a system configured for evaluating images. The system may include one or more hardware processors configured by machine-readable instructions. The processor(s) may be configured to identify a first image. The processor(s) may be configured to extract a first set of features from the first image to generate a first feature tensor for the first image. The processor(s) may be configured to extract a second set of features from the first image to generate a second feature tensor for the first image. The processor(s) may be configured to identify a second image. The processor(s) may be configured to extract a third set of features from the second image to generate a third feature tensor for the second image. The processor(s) may be configured to extract a fourth set of features from the second image to generate a fourth feature tensor for the second image. The processor(s) may be configured to apply a first regression analysis to determine a first geometrical distance between the first feature tensor of the first image and the third feature tensor of the second image. The processor(s) may be configured to apply a second regression analysis to determine a second geometrical distance between the second feature tensor of the first image and the fourth feature tensor of the second image. The processor(s) may be configured to determine a similarity between the first image and the second image based on the first geometrical distance and the second geometrical distance.

In some implementations of the system, the processor(s) may be configured to calculate a similarity score representing a degree of visual similarity between the first image and the second image.

In some implementations of the system, the processor(s) may be configured to calculate a uniqueness score of the first image with respect to the second.

In some implementations of the system, calculating the uniqueness score of the first image may include calculating an inverse of the similarity score. In some implementations of the system, calculating the uniqueness score of the first image may include identifying the inverse as the uniqueness score.

In some implementations of the system, the processor(s) may be configured to reduce a dimensionality of the first feature tensor prior to applying the first regression analysis to determine the first geometrical distance between the first feature tensor of the first image and the third feature tensor of the second image.

In some implementations of the system, the processor(s) may be configured to apply a weight to the first set of features extracted from the first image to generate a set of weighted first features. In some implementations of the system, the first feature tensor may be generated based on the set of weighted first features.

In some implementations of the system, the first set of features extracted from the first image may include object features. In some implementations of the system, the processor(s) may be configured to extract the first set of features from the first image by propagating data corresponding to the first image through at least one network including at least one of an object detection neural network, an object classification neural network, or an object recognition neural network. In some implementations of the system, the network may include an input layer, a plurality of intermediate layers, and an output layer. In some implementations of the system, the processor(s) may be configured to extract the first set of features from the first image by extracting outputs from at least one of the plurality of intermediate layers of the network.

In some implementations of the system, extracting the first set of features from the first image may include extracting at least one of a set of object features, a set of scene features, a set of intensity features, a set of contrast features, a set of color features, and a set of blurriness features from the first image.

Another aspect of the present disclosure relates to a method for evaluating images. The method may include identifying a first image. The method may include extracting a first set of features from the first image to generate a first feature tensor for the first image. The method may include extracting a second set of features from the first image to generate a second feature tensor for the first image. The method may include identifying a second image. The method may include extracting a third set of features from the second image to generate a third feature tensor for the second image. The method may include extracting a fourth set of features from the second image to generate a fourth feature tensor for the second image. The method may include applying a first regression analysis to determine a first geometrical distance between the first feature tensor of the first image and the third feature tensor of the second image. The method may include applying a second regression analysis to determine a second geometrical distance between the second feature tensor of the first image and the fourth feature tensor of the second image. The method may include determining a similarity between the first image and the second image based on the first geometrical distance and the second geometrical distance.

In some implementations of the method, it may include calculating a similarity score representing a degree of visual similarity between the first image and the second image.

In some implementations of the method, it may include calculating a uniqueness score of the first image with respect to the second.

In some implementations of the method, calculating the uniqueness score of the first image may include calculating an inverse of the similarity score. In some implementations of the method, calculating the uniqueness score of the first image may include identifying the inverse as the uniqueness score.

In some implementations of the method, it may include reducing a dimensionality of the first feature tensor prior to applying the first regression analysis to determine the first geometrical distance between the first feature tensor of the first image and the third feature tensor of the second image.

In some implementations of the method, it may include applying a weight to the first set of features extracted from the first image to generate a set of weighted first features. In some implementations of the method, the first feature tensor may be generated based on the set of weighted first features.

In some implementations of the method, the first set of features extracted from the first image may include object features. In some implementations of the method, it may include extracting the first set of features from the first image by propagating data corresponding to the first image through at least one network including at least one of an object detection neural network, an object classification neural network, or an object recognition neural network. In some implementations of the method, the network may include an input layer, a plurality of intermediate layers, and an output layer. In some implementations of the method, it may include extracting the first set of features from the first image by extracting outputs from at least one of the plurality of intermediate layers of the network.

In some implementations of the method, extracting the first set of features from the first image may include extracting at least one of a set of object features, a set of scene features, a set of intensity features, a set of contrast features, a set of color features, and a set of blurriness features from the first image.

Yet another aspect of the present disclosure relates to a non-transient computer-readable storage medium having instructions embodied thereon, the instructions being executable by one or more processors to perform a method for evaluating images. The method may include identifying a first image. The method may include extracting a first set of features from the first image to generate a first feature tensor for the first image. The method may include extracting a second set of features from the first image to generate a second feature tensor for the first image. The method may include identifying a second image. The method may include extracting a third set of features from the second image to generate a third feature tensor for the second image. The method may include extracting a fourth set of features from the second image to generate a fourth feature tensor for the second image. The method may include applying a first regression analysis to determine a first geometrical distance between the first feature tensor of the first image and the third feature tensor of the second image. The method may include applying a second regression analysis to determine a second geometrical distance between the second feature tensor of the first image and the fourth feature tensor of the second image. The method may include determining a similarity between the first image and the second image based on the first geometrical distance and the second geometrical distance.

In some implementations of the computer-readable storage medium, the method may include calculating a similarity score representing a degree of visual similarity between the first image and the second image.

In some implementations of the computer-readable storage medium, the method may include calculating a uniqueness score of the first image with respect to the second.

In some implementations of the computer-readable storage medium, calculating the uniqueness score of the first image may include calculating an inverse of the similarity score. In some implementations of the computer-readable storage medium, calculating the uniqueness score of the first image may include identifying the inverse as the uniqueness score.

In some implementations of the computer-readable storage medium, the method may include reducing a dimensionality of the first feature tensor prior to applying the first regression analysis to determine the first geometrical distance between the first feature tensor of the first image and the third feature tensor of the second image.

In some implementations of the computer-readable storage medium, the method may include applying a weight to the first set of features extracted from the first image to generate a set of weighted first features. In some implementations of the computer-readable storage medium, the first feature tensor may be generated based on the set of weighted first features.

In some implementations of the computer-readable storage medium, the first set of features extracted from the first image may include object features. In some implementations of the computer-readable storage medium, the method may include extracting the first set of features from the first image by propagating data corresponding to the first image through at least one network including at least one of an object detection neural network, an object classification neural network, or an object recognition neural network. In some implementations of the computer-readable storage medium, the network may include an input layer, a plurality of intermediate layers, and an output layer. In some implementations of the computer-readable storage medium, the method may include extracting the first set of features from the first image by extracting outputs from at least one of the plurality of intermediate layers of the network.

In some implementations of the computer-readable storage medium, extracting the first set of features from the first image may include extracting at least one of a set of object features, a set of scene features, a set of intensity features, a set of contrast features, a set of color features, and a set of blurriness features from the first image.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
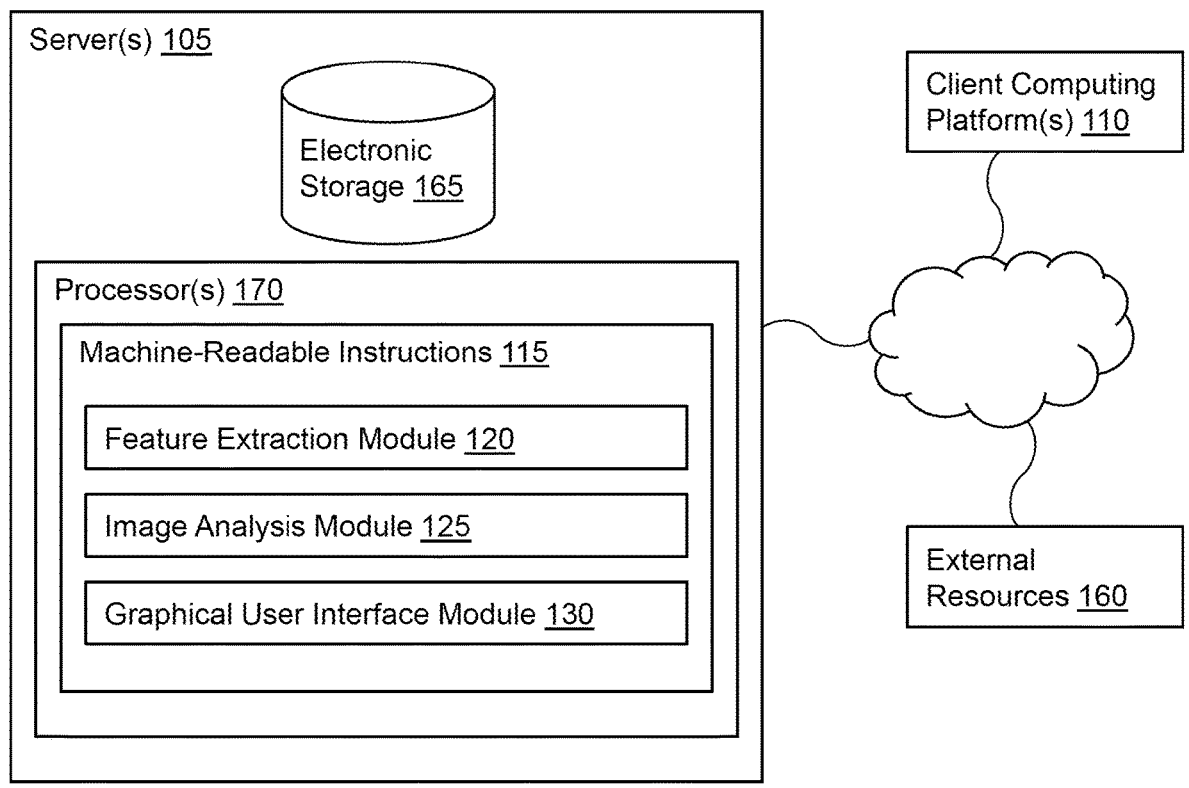
FIG. 1 illustrates a system configured for evaluating images, in accordance with one or more implementations.

Image-based content can be among the most important content posted by users to web-based or online platforms, such as social media websites and other websites. Such content can also be referred to as "creative," and can be included as part of an advertising campaign of a business, a post from an individual that contributes to the individual's online image, a graphic design composition using a software application like Photoshop, or a photograph captured via a user's camera on a mobile device. Often, users (e.g., businesses or individuals) post content items such as images that are intended to have a common theme. For example, a user may post images having similar subject matter (e.g., relating to a particular topic) or images that are intended to appeal to a group of viewers who share a particular set of demographic characteristics. Such a group can be referred to as a target audience or intended audience.

Selecting one or more images that are similar to a given set of images can be challenging. For example, a user may capture a large volume of images and store the images together on a computing device, such as within an image gallery application of a mobile phone. It can be difficult and time consuming for the user to manually evaluate each image to find a group of images that share certain characteristics, such as similarity or relevance to a common theme or subject matter.

The systems and methods described in this disclosure can implement an image evaluation mechanism which can identify a group of similar images within a database, photo gallery application, or other set of images. The systems and methods of this disclosure can also be used to identify one or more images from within a set of images that are similar to a selected candidate image. For example, various computer-implemented techniques, including artificial intelligence and machine learning algorithms, can be used to extract features from each digital image to evaluated. The feature extraction itself can make use of artificial intelligence techniques including object detection or recognition neural networks. The extracted features can then be processed using additional analytical techniques to determine a degree of similarity between the features of a candidate image and a set of other images or a degree of pairwise similarity between two candidate images.

In some implementations, features can be extracted from an image via one or more fully connected and/or convolutional layers of one or more deep learning models. Other features can be extracted via additional computational processes and from the inference results of deep learning models. The deep learning models can include models for object detection, scene detection, etc.

In some implementations, features can be represented as vectors or tensors. For example, a first set of features, such as features relating to objects, can be extracted from an image and represented as an object feature tensor. A second set of features, such as features relating to scenes, can be extracted from the image and represented as a scene feature tensor. In some implementations, any number of different feature types may be extracted from an image and represented as a respective feature tensor. This data can optionally be adjusted and the dimensionality of the resulting tensors can be reduced, for example via principal component analysis (PCA). In some implementations, reducing the dimensionality of a feature tensor can reduce the amount of data to be processed, thereby saving time and improving computational efficiency, while still allowing accurate similarity detection to be accomplished.

Feature tensors for images can be used in two separate but related processes. For example, the feature tensors can be used to calculate the similarity of two images, which may be referred to as pairwise similarity. The feature tensors also can be used to calculate a degree of similarity between one candidate image and a given set of other images, which may be referred to as set similarity. In the case of pairwise similarity, the distance between the feature tensors for each feature or attribute can be calculated and normalized. For example, two candidate images a and b, the distances are calculated using the following formula: $D_1 = ABS(T1_a - T1_b)$, $D_2 = ABS(T2_a - T2_b)$, etc., where D represents the scalar distance and T represents a feature tensor. The scalar values for the distance calculations can then be compared using a regression algorithm that can apply a respective weight to the different distances and combine them to produce a final similarity score. For example, a similarity score may be calculated using the following formula: $W_1 D_1 + W_2 D_2 + W_3 D_3 + W_4 D_4$, etc., where W represents a respective weighting for a given feature type.

In the case of set similarity, the frequency of features in the set of images can be used to create a generative model of all such features contained in the set of images. The extracted features of a candidate image can then be compared against these generative models to determine how frequent the features in each tensor occur in the set of images used to create the generative model.

In some implementations, Similarity can be used for finding other similar social media accounts in a database, which can be then used to derive similar images to a candidate image. In some implementations, similarity results can also be introduced into an additional machine learning model to determine visually similar images that also appeal to a particular target audience.

In some implementations, similarity of images can be used to make visual recommendations to users. For example, if a user sells a particular product through a web-based store, an image of that product can be retrieved from the user's product listing and matched for similarity against one or more sets of others images that may be similar, such as images from a social media website with a theme that is relevant to the product. This can help to identify images similar to the user's product listing, but which may also be more appealing to the same audience. Then a recommendation can be made to the user suggesting that the user update the product listing to replace the original image with a new or similar image to improve performance.

In some implementations, the inverse of visual similarity can be referred to as a "uniqueness" measure. For example, uniqueness can also be used in matching accounts, or image sets, that are uniquely associated with a particular brand, product, topic, event, or theme. Uniqueness is also a measure that can be calculated for a set or in a pairwise manner for two or more images.

In some implementations, the systems and methods of this disclosure can provide an image search capability of an image database, such as a stock photo website. For example, a user may identify a copyrighted image that the user may not have permission to publish. The systems and methods of this disclosure can search an image database to find other images that are similar to the copyright protected image, but available for public use, thereby providing reverse-image search functionality. Thus, by performing similarity analysis using a set of images hosted, for example, by a free stock photo website, the systems and methods of this disclosure can identify one or more visually-similar images that are royalty-free to use. This can be highly beneficial to users searching for images that are free and open to use. Without the techniques described in this disclosure, identifying such images can be an extremely time consuming and computationally intensive process. In some implementations, the systems and methods of this disclosure can also evaluate and rank two or more candidate images identified as similar to a give image or set of images based on their appeal to one or more audiences.

In some implementations, the techniques of this disclosure can implement a similarity determination process that is adjusted for weighting certain feature types more heavily than others. For example, the systems and methods of this disclosure can determine a degree of similarity between images while giving a higher weight (e.g., a greater significance) to object-related features in the images than to other types of features. In general, any combination of features can be assigned any combination of weights. For example, in some implementations, extra weight can be given to features that may relate to similar color palettes, etc.

The subject matter described in this disclosure can be used to overcome technical challenges relating to determining set-based or pairwise similarity of images. For example, it can be difficult to determine a degree of similarity of two or more digital images based on raw image data alone, because there may not be significant meaning in the pixel-by-pixel variation of each image that relates to how the image is perceived by a human viewer. This disclosure provides technical solutions to this technical challenge. For example, this disclosure provides techniques for imitating human visual cognition by first extracting features from images, rather than relying on the raw image data to determine similarity between images. As a result, the total amount of data can be reduced relative to the raw image data, thereby allowing less computationally intensive solutions that provide a high degree of accuracy in computing similarity between images as a human viewer would perceive them. This can enable the model to run on computer hardware that does not require large amounts of memory.

It can also be a technical problem to identify and extract meaningful features from an image in an automated fashion. To address this technical challenge, in some implementations classification or detection networks can be used to extract features from an image. These types of networks can be used to classify an input image into one of a small number of states. For example, a detection network could be used to determine whether an image includes a dog (e.g., the model classifies images into two states, including one state for images that depict dogs and another state for images than do not depict dogs). Such a network may include nodes arranged in layers including an input layer, several hidden layers that form a "black box," and an output layer that provides an answer to the classification question. For many applications, the outputs of hidden layers of a classification network may not be of interest because they do not answer a classification question, and so they are often ignored. However, as described further below, the outputs of these hidden layers in a classification network that is used to process image data (e.g., an object detection network, a scene detection network, etc.) can provide useful information about features of an image that are important to human perception of the image, such as its general subject matter or theme. This disclosure describes techniques for using such information to efficiently compare two or more images to determine a degree of similarity of the images.

FIG. 1 illustrates a system 100 configured for evaluating images, in accordance with one or more implementations. In some implementations, system 100 may include one or more servers 105. Server(s) 105 may be configured to communicate with one or more client computing platforms 110 according to a client/server architecture and/or other architectures. Client computing platform(s) 110 may be configured to communicate with other client computing platforms via server(s) 105 and/or according to a peer-to-peer architecture and/or other architectures. Users may access system 100 via client computing platform(s) 110.

Server(s) 105 may be configured by machine-readable instructions 115. Machine-readable instructions 115 may include one or more instruction modules. The instruction modules may include computer program modules. The instruction modules may include one or more of a feature extraction module 120, an image analysis module 125, a graphical user interface (GUI) module 130, and/or other instruction modules.

Together, the feature extraction module 120, the image analysis module 125, the graphical user interface (GUI) module 130, and the other components of the system 100 can be configured to determine a similarity score for a candidate image and a selected set of other images. Thus, the system 100 may first gather, collect, receive, or otherwise access a set of images against which the candidate image is to be compared. The system 100 also may be configured to calculate a pairwise similarity score representing a degree of similarity for two images. The similarity score can represent a degree of similarity between the candidate image the selected set of images.

In some implementations, the image analysis module 125 may be configured to select a set of training images. The image analysis module 125 may also be configured to select the set of training images based on at least one of a common subject matter, a common author, a common origin, or a common theme. For example, the set of training images can be selected from among a set of images posted to a social media website by a particular user or author. In some implementations, the training images can be selected based on an indication that the images appeal to a particular target audience or are otherwise relevant to a particular target audience.

Feature extraction module 120 may be configured to extract a first set of features from each training image of the set of training images to generate a first feature tensor for each training image. The first set of features extracted from each training image may include object features. By way of non-limiting example, extracting the first set of features from each training image may include extracting at least one of a set of object features, a set of scene features, a set of intensity features, a set of contrast features, a set of color features, and a set of blurriness features from each training image. In some implementations, the image analysis module 125 may be configured to select a first set of features to be extracted from the set of training images based at least in part on the brand attribute, such as a font or a color scheme of a brand logo.

The feature extraction module 120 may also be configured to extract a second set of features from each training image to generate a second feature tensor for each training image. In some implementations, the feature extraction module 120 may be configured to extract the first set of features from each training image by propagating data corresponding to each training image through at least one network including at least one of an object detection neural network, an object classification neural network, or an object recognition neural network. By way of non-limiting example, the network may include an input layer, a plurality of intermediate layers, and an output layer. In some implementations, the feature extraction module 120 may be configured to extract the first set of features from each training image by extracting outputs from at least one of the plurality of intermediate layers of the network.

In some implementations, the image analysis module 125 may be configured to reduce a dimensionality of each first feature tensor to generate a first modified feature tensor for each training image. The image analysis module 125 may also be configured to reduce a dimensionality of each second feature tensor to generate a second modified feature tensor for each training image. The image analysis module 125 may also be configured to reduce a dimensionality of the candidate image feature tensor to generate a modified candidate image feature tensor. Reducing the dimensionality of each first feature tensor (or any other feature tensor) may include, for example, applying principal component analysis to each first feature tensor to generate a first modified feature tensor for each training image. Determining whether the candidate image may be similar to the set of training images can then include comparing the modified candidate image feature tensor with the first generative model. This can result in improved computational efficiency, relative to performing a comparison of the unmodified (e.g., higher dimensional) candidate image feature tensor with the first generative model.

In some implementations, the image analysis module 125 may be configured to construct a first generative model representing the first set of features and a second generative model representing the second set of features of the set of training images, based on the first modified feature tensors and the second modified feature tensors of each training image of the set of training images.

After the generative models have been constructed based on the features included in the training images, the image analysis module 125 may be configured to identify a first candidate image. For example, the candidate image can be any image whose similarity (or dissimilarity) to the training images is of interest. In some implementations, the candidate image can be provided by a user. For example, the GUI module 130 may be configured to provide a graphical user interface to be displayed on a computing device, such as the client computing platform(s) 110. The graphical user interface may display a plurality of indications, such as thumbnails or titles, corresponding to a set of candidate images. For example, the set of candidate images can be any or all of the images stored in a photo gallery application on the computing device. In some implementations, the GUI module 130 may be configured to receive a user selection of a first indication or the plurality of indications corresponding to the selected candidate image whose degree of similarity to the training images is of interest.

In some implementations, there may be a set of candidate images, all of whom are to be evaluated with respect to the training set of images. For example, the image analysis module 125 may be configured to identify the set of candidate images including the first candidate image. The image analysis module 125 may be configured to determine, for each candidate image of the set of candidate images, whether the candidate image is similar to the set of training images based on the first candidate image and each of the first generative model and the second generative model. The image analysis module 125 may also be configured to identify a subset of the set of candidate images that are similar to the set of training images. For example, the image analysis module 125 may be configured to apply a regression algorithm to the first candidate image and each of the first generative model and the second generative model to determine whether the first candidate image is similar to the set of training images.

Image analysis module 125 may be configured to calculate a similarity score representing a degree of visual similarity between the first candidate image and the set of training images, based on the regression algorithm. In some implementations, the image analysis module 125 may also be configured to calculate a uniqueness score of the first candidate image with respect to the set of training images. For example, calculating the uniqueness score of the first candidate image may include calculating an inverse of the similarity score. In some implementations, the image analysis module 125 can identify the inverse as the uniqueness score.

In some implementations, the feature extraction module 120 may be configured to extract features from the first candidate image to generate a candidate image feature tensor. The features may correspond to the first set of features extracted from each candidate image. The image analysis module 125 may also be configured to apply a weight to the features extracted from the candidate image to generate a set of weighted candidate image features. The candidate image feature tensor may be generated based on the set of weighted candidate image features. In some implementations, the weighting of the features can instead be applied directly to each candidate image before the features are extracted, rather than applied to the feature tensors.

In some implementations, the image analysis module 125 may be configured to identify respective locations of the first feature tensor and the second feature tensor in a feature space defined by the first set of features and the second set of features. The image analysis module 125 may also be configured to generate a visual signature for the set of training images based on the respective locations of the first feature tensor and the second feature tensor. For example, a visual signature can include metadata relating to the content of a visual fingerprint. A visual fingerprint can be a representation of a single image derived from the feature extraction processes described above. The visual fingerprint can indicate the important attributes of a single image and can help to distinguish and compare individual images against one another. The visual fingerprint of individual images collectively can enable a similarity classifier, which may be a similarity score.

The visual signature can be derived from all the visual fingerprints of an image collection. For example, the visual signature can be or can represent an overall distribution of visual fingerprints for a collection of images. For example, this can be derived from a user's image library, where the visual fingerprints of the images in the user's library are used to generate an overall signature for that user's library. That signature can in turn be used as a metric to compare one user's image library against another user's image library to determine how similar those image libraries are. Thus, analysis can be conducted upon visual fingerprints in a visual signature (e.g. similarity scores for similarity classifiers, clustering of feature tensor locations in multidimensional space, performance scores, labels, etc.) This can provide a means of generating a surface match for any query of a visual signature. In some implementations, additional analysis can also be conducted using the original fingerprints from which the visual signature was derived.

In some implementations, the system 100 may be configured to calculate a pairwise similarity score representing a degree of similarity for two images, rather than a set-based similarity for a candidate image as described above. For example, the image analysis module 125 may be configured to identify a first image and a second image whose degree similarity to one another is of interest. In some implementations, the feature extraction module 120 may be configured to extract a first set of features from the first image to generate a first feature tensor for the first image. The first set of features extracted from the first image may include object features. By way of non-limiting example, extracting the first set of features from the first image may include extracting at least one of a set of object features, a set of scene features, a set of intensity features, a set of contrast features, a set of color features, and a set of blurriness features from the first image. The feature extraction module 120 may also be configured to extract a second set of features from the first image to generate a second feature tensor for the first image.

In some implementations, the feature extraction module 120 may be configured to extract a third set of features from the second image to generate a third feature tensor for the second image. The feature extraction module 120 may also be configured to extract a fourth set of features from the second image to generate a fourth feature tensor for the second image.

In some implementations, the feature extraction module 120 may be configured to extract the first set of features from the first image by propagating data corresponding to the first image through at least one network including at least one of an object detection neural network, an object classification neural network, or an object recognition neural network. By way of non-limiting example, the network may include an input layer, a plurality of intermediate layers, and an output layer. The feature extraction module 120 may be configured to extract the first set of features from the first image by extracting outputs from at least one of the plurality of intermediate layers of the network.

In some implementations, the image analysis module 125 may be configured to apply a first regression analysis to determine a first geometrical distance between the first feature tensor of the first image and the third feature tensor of the second image. The image analysis module 125 may also be configured to apply a second regression analysis to determine a second geometrical distance between the second feature tensor of the first image and the fourth feature tensor of the second image.

In some implementations, the image analysis module 125 may be configured to determine a similarity between the first image and the second image based on the first geometrical distance and the second geometrical distance. Image analysis module 125 may be configured to calculate a similarity score representing a degree of visual similarity between the first image and the second image. In some implementations, the image analysis module 125 may be configured to calculate a uniqueness score of the first image with respect to the second. Calculating the uniqueness score of the first image may include calculating an inverse of the similarity score. For example, the image analysis module 125 may identify the inverse as the uniqueness score.

In some implementations, the image analysis module 125 may be configured to reduce a dimensionality of the first feature tensor prior to applying the first regression analysis to determine the first geometrical distance between the first feature tensor of the first image and the third feature tensor of the second image. In some implementations, the image analysis module 125 may be configured to apply a weight to the first set of features extracted from the first image to generate a set of weighted first features. The first feature tensor may be generated based on the set of weighted first features.

Figure 2:
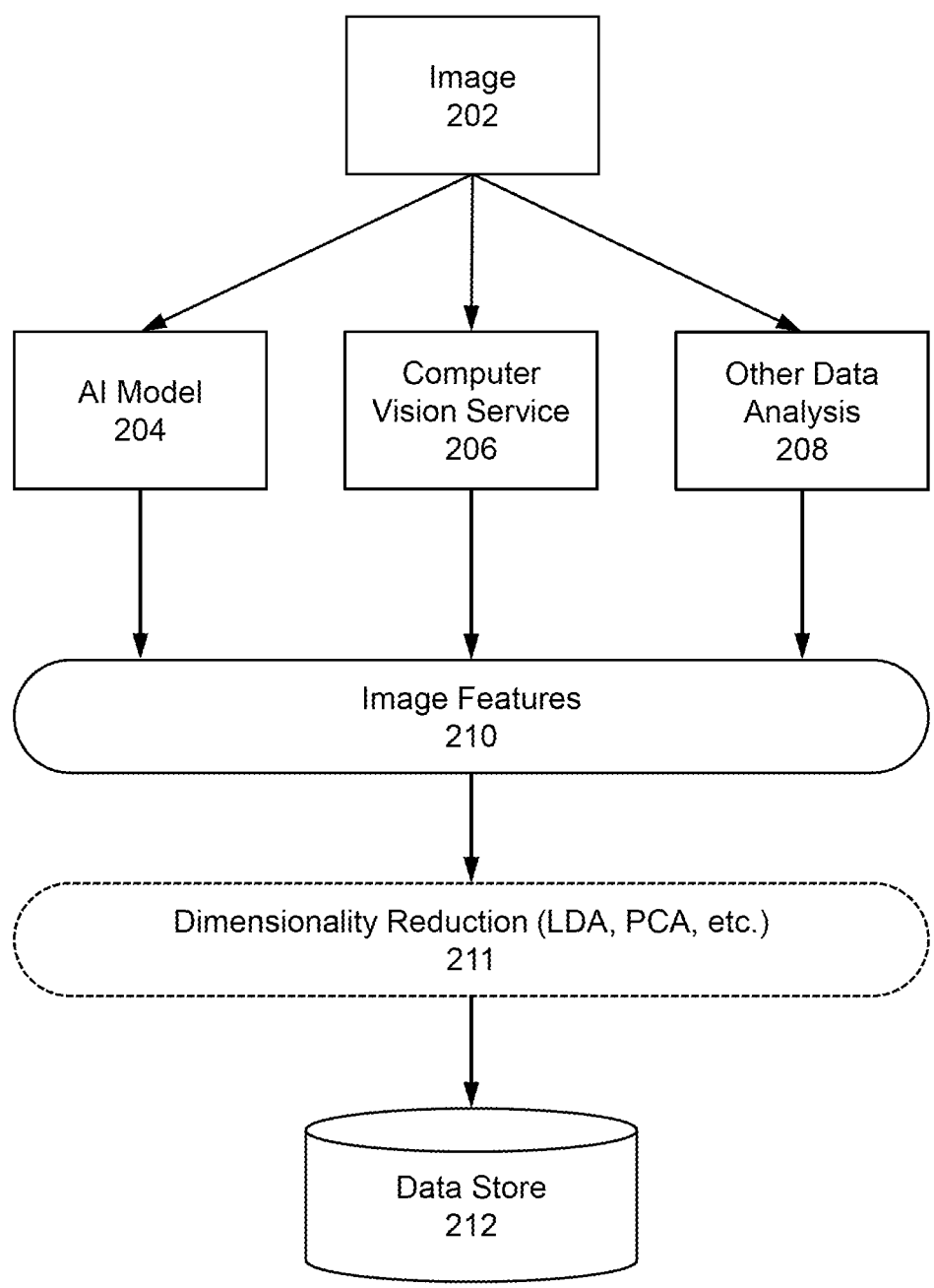
FIG. 2 illustrates data flow in a process for extracting features from images, in accordance with one or more implementations.

FIGS. 2-6 depict processes for extracting features from images, constructing a generative model, and using the generative model to determine a similarity score for a candidate image with respect to a set of training images or with respect to a single second image. The processes depicted in FIGS. 2-6 can be implemented, for example, by the server 102 of FIG. 1. Thus, FIGS. 2-6 are described below with reference also to FIG. 1. Referring now to FIG. 2, data flow in a process for extracting features from images is illustrated, in accordance with one or more implementations. The process 200 can be performed, for example, by the feature extraction module 120 of FIG. 1. It should be understood that, while FIG. 2 shows feature extraction for a single image 202, the process 200 can be repeated for any number of images included in a set of images, such as images in a database or photo gallery application. The process 200 can include using one or more artificial intelligence models 204, one or more computer vision services 206, and other data analysis techniques 208 to extract features from the image 202.

In some implementations, the feature extraction module 120 can implement the one or more artificial intelligence models 204, the one or more computer vision services 206, and the other data analysis techniques 208. For example, the one or more artificial intelligence models 204, the one or more computer vision services 206, and the other data analysis techniques 208 can each include an artificial neural network that includes nodes arranged in a plurality of layers. Each node can be a computational unit, which may also be referred to as an artificial neuron. The layers can be arranged sequentially such that a node receives an input signal from one or more of the nodes in the previous layer, processes the input according to a function to produce an output, and transmits the output to one or more nodes of the next layer. The first layer of such a network can be referred to as an input layer, and can receive the raw image data (e.g., data corresponding to each individual pixel of the image 202). The final layer can be referred to as an output layer. Thus, the image data for the image 202 can be propagated through the layers of an artificial neural network to cause the artificial neural network to produce one or more outputs at each layer of the artificial network, including the final or output layer.

In some implementations, any of the one or more artificial intelligence models 204, the one or more computer vision services 206, and the other data analysis techniques 208 can be a detection network. For example, a detection network can be configured to determine a presence or absence of one or more predetermined characteristics of the image 202, such as the features of a scene depicted in the image 202, the features of objects depicted in the image 202, a color or colors most prevalent in the image 202, etc. Each such network can be used to extract a respective set of image features 210 from the image 202. Thus, a scene detection network can be used to extract a set of scene features from the image 202, an object detection network can be used to extract a set of object features from the image 202, etc.

In some implementations, the feature extraction module 120 can use the outputs of an intermediate layer of an artificial neural network corresponding to any of the one or more artificial intelligence models 204, the one or more computer vision services 206, the other data analysis techniques 208. An intermediate layer can be any layer between the input layer and the output layer. Thus, while a detection network may have an output layer that outputs a binary signal (e.g., indicating presence or absence of a particular trait in the image 202), the outputs of intermediate layers also can be relevant to image features 210 in the image 202. In some implementations, these intermediate outputs can be mathematically descriptive of the image 202 itself. In some implementations, the feature extraction module 120 can extract the image features 210 based on the outputs of an intermediate layer of an artificial neural network (e.g., any of the one or more artificial intelligence models 204, the one or more computer vision services 206, and the other data analysis techniques 208), which may be represented as a vector, a tensor, or any other form of information.

The image features 210 that can be extracted from the image 202 by the feature extraction module 120 are not limited to object, scene, or color features. For example, the features extracted from the image 202 can be or can include any stylistic features that may relate to any visual characteristic of an image, such as layout, position, symmetry, balance, arrangement, composition, pixel intensity, contrast, blurriness, object location, depth of field, angle of view, focal point, view point, vantage point, foreground/background content, white space/negative space, cropping, framing, color scheme, hue, tint, temperature, tone, saturation, brightness, shade, mood, line, angles, noise, contours, gradients, texture, repetition, patterns, blowout, blooming, concentricity, cubic attributes, geometric attributes, shadow, blocked shadow, vignetting, scale, number of objects, position of objects, spatial context, proportion, shapes, shape of objects, number of shapes, attributes of objects, form, perspective, representation, path, scenery, time of day, exposure, time lapse, typography, position of headline, size of headline, length of text, location of call-to-action, typeface, font, location of faces, posture/pose of people, location of figures, gestures, action/activities of people, number of people, hair color of people, ethnicity of people, gender of people, age of people, expressions and emotions of people, facial attributes, clothing and appearance, accessories, resolution, orientation, icons, emojis, logos, watermarks, etc. It should be understood that this list of attributes is exemplary only, and should be not read as limiting the scope of this disclosure.

Other types of features of the images in the training dataset also can be extracted from the image 202. It should be understood that while the image features 210 are depicted as a single entity in FIG. 2 for illustrative purposes, in some implementations separate sets of image features 210 may be extracted by each of the one or more artificial intelligence models 204, the one or more computer vision services 206, and the other data analysis techniques 208. The image feature manager 110 can process these separate sets of features, for example by altering a format of the feature sets or combining the feature sets, to produce the image features 210. In some implementations, the image features 210 can be represented mathematically as one or more feature tensors. For example, a respective feature tensor can be generated for each of one or more feature types for the image 202. In some implementations, the process 200 can include reducing a dimensionality of one or more feature tensors or other data structures used to implement the image features 210. For example, dimensionality can be reduced by applying an analytical technique such as principal component analysis to one or more of the tensors or other data structures used to represent the image features 210. In some implementations, reducing the dimensionality can help to reduce the overall size of the image features 210. The feature extraction module 120 can store the image features 210 in a data store 212. In some implementations, the data store 212 can correspond to electronic storage 165 of FIG. 2.

Figure 3:
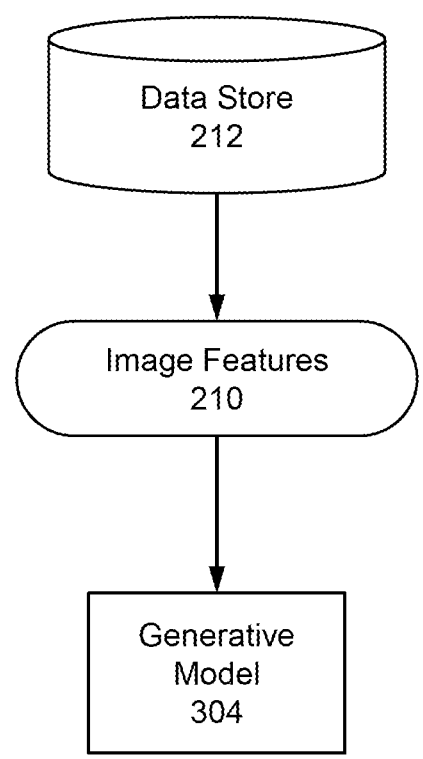
FIGS. 3 and 4 illustrate data flow in a process for constructing a generative model, in accordance with one or more implementations.
Figure 4:
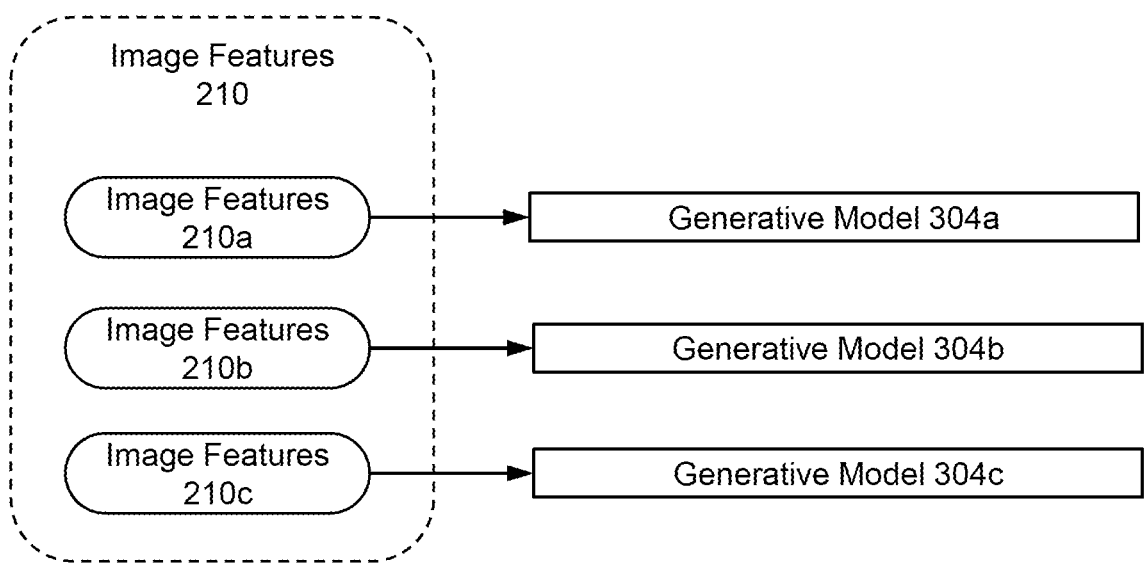

FIGS. 3 and 4 illustrate data flow in a process for constructing a generative model, in accordance with one or more implementations. Additional, fewer, or different operations may be performed in process 300 and process 400. The process 300 of FIG. 3 and the process 400 of FIG. 4 can make use of the image features 210 extracted in the process 200 of FIG. 2. For example, as shown in FIG. 3, the image features 210 can be retrieved from the data store 212 and processed, manipulated, or otherwise used to construct a generative model 304. In some implementations, the generative model can be a mathematical model (e.g., data stored in one or more data structures) that represents the distribution of image features 210 within the image 202. For example, in some implementations, the generative model can be a mathematical model that represents the joint probability distribution of image features 210 within the image 202.

In some implementations, more than one generative model may be produced. For example, as shown in the process 400 of FIG. 4, multiple generative models 304a-304c can be produced based on the set of image features 210. As shown, the image features 210 can be divided into subsets of image features 210a, 210b, and 210c. Generally, the subsets of image features 210a, 210b, and 210c can be non-overlapping with one another. In some implementations, the subsets of image features 210a, 210b, and 210c can be grouped according to categories or types of features, such as object features, scene features, color features, etc. Thus, each subset 210a, 210b, and 210c of the image features 210 can be represented as a respective tensor that contains information about one type or category of features included in the image features 210. In some implementations, a respective generative model 304a, 304b, and 304c can be constructed, based on each of the subsets 210a, 210b, and 210c of the image features 210. Thus, the generative model 304a can represent the distribution of the subset of image features 210a, the generative model 304b can represent the distribution of the subset of image features 210b, and the generative model 304c can represent the distribution of the subset of image features 210c. In some implementations, the generative models 304a-304c can be combined into a single generative model 304.

FIGS. 3 and 4 show the general approach for propagating image features 210 for a single image 202 through the layers of the machine learning model 304 in order to train the model. It should be appreciated that these processes may be repeated with image features 210 from the other images 202 in the set of training images, to produce one or more generative models 304 for each image in the set of training images.

Figure 5:
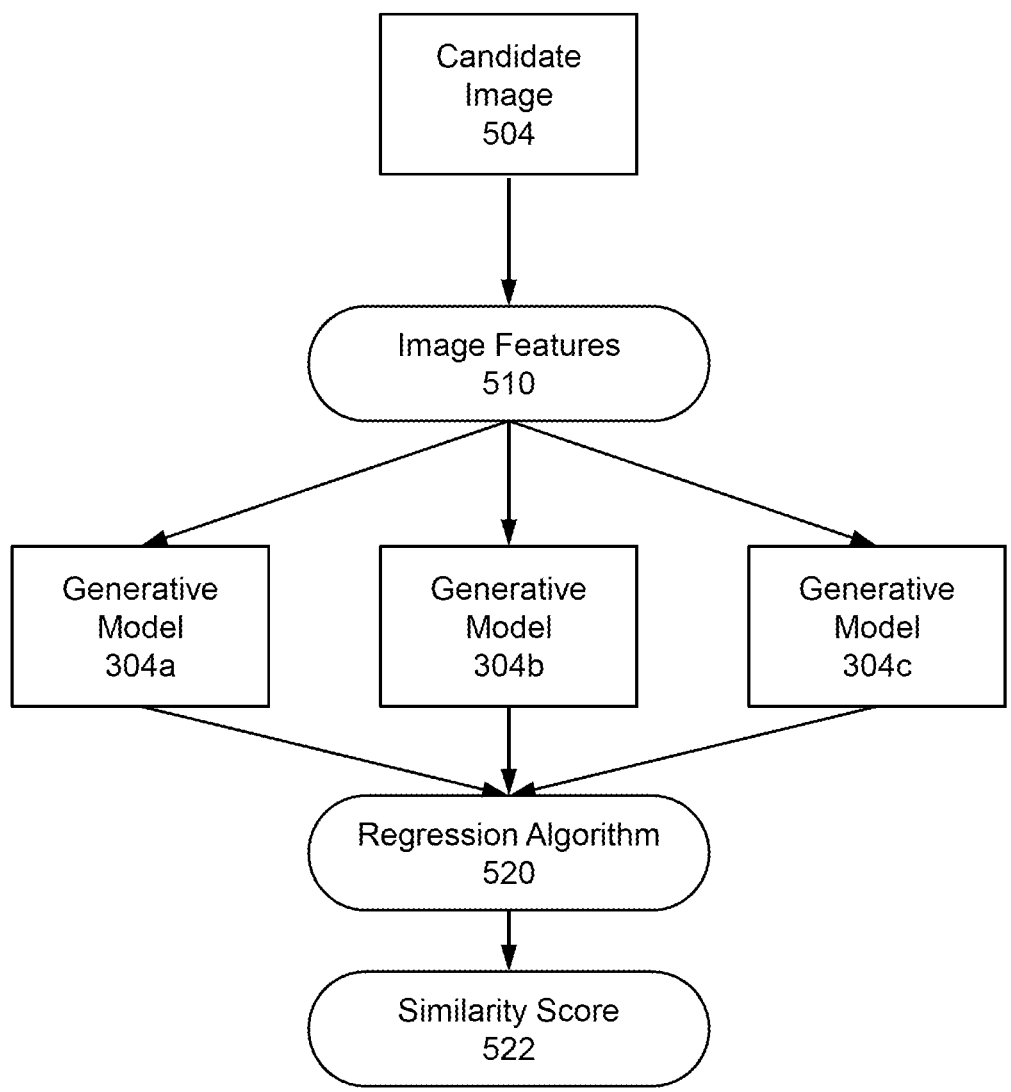
FIG. 5 illustrates data flow in a process for generating a similarity score for an image, in accordance with one or more implementations.

FIG. 5 illustrates data flow in a process 500 for generating a similarity score for a candidate image 504, in accordance with one or more implementations. Additional, fewer, or different operations may be performed in process 500. In some implementations, the process 500 can be performed by the image analysis module 125 of FIG. 1. The process 500 can make use of the one or more generative models 304 that has been constructed for each image in the set of training images according to the processes 300 and 400 shown in FIGS. 3 and 4, respectively. The candidate image 504 can be any image whose similarity to the set of training images is of interest. For example, a user of one of the client computing devices 104 may submit the candidate image 504 for a similarity determination. In some implementations, a user may submit more than one candidate image 504 and each candidate image 504 can be scored separately to determine its similarity with respect to the set of training images, using the process 500.

In some implementations, data flow for scoring the candidate image 504 can be similar to data flow for constructing the generative model 304 with each training image. For example, a set of image features 510 can be extracted from the candidate image 504. In some implementations, the image features 510 can be extracted from the candidate image 504 using the same or similar techniques described above for extracting the image features 210 from an image 202. For example, as show in FIG. 2, one or more AI models 204, one or more computer vision services 206, and other data analysis techniques 208 can be used to extract features from the candidate image 504. In some implementations, the one or more AI models 204, the one or more computer vision services 206, and the other data analysis techniques 208 may be or may include artificial neural networks having layered structures, and features may be extracted from intermediate layers of these artificial neural networks. In some implementations, dimensionality of one or more feature tensors included in the image features 510 can be reduced using techniques similar to those described above.

The problem of calculating a degree of similarity between the candidate image 504 and the set of training images can be a regression problem. For example, a regression algorithm 520 can be used to compare the image features 510 of the candidate image with each of the generative models 304a, 304b, and 304c for the images included in the training set. Thus, the image analysis module 125 can be configured to apply the regression algorithm 520 to compare feature tensors included in the image features 510 of the candidate image with the corresponding generative models 304a representing the training images. In some implementations, the regression algorithm 520 can be used to compute a distance (e.g., a geometric distance in a space defined by the image features 510) between the image features 510 of the candidate image and the image features 210 of each training image (as represented by the generative models 304a, 304b, and 304c). The image analysis module 125 can calculate a similarity score 522 based on the results of the regression algorithm 520. For example, if the regression algorithm 520 indicates that the image features 510 are relatively close to the generative models 304a, 304b, and 304c, the image analysis module 125 can calculate a similarity score 522 indicating that the candidate image 504 is relatively similar to the set of training images. If the regression algorithm 520 indicates that the image features 510 are relatively far from the generative models 304a, 304b, and 304c, the image analysis module 125 can calculate a similarity score 522 indicating that the candidate image 504 is relatively dissimilar to the set of training images. In some implementations, the similarity score can be a numerical value. For example, the similarity score may be an integer between zero and 100, or a decimal value between 0 and 1.

Figure 6:
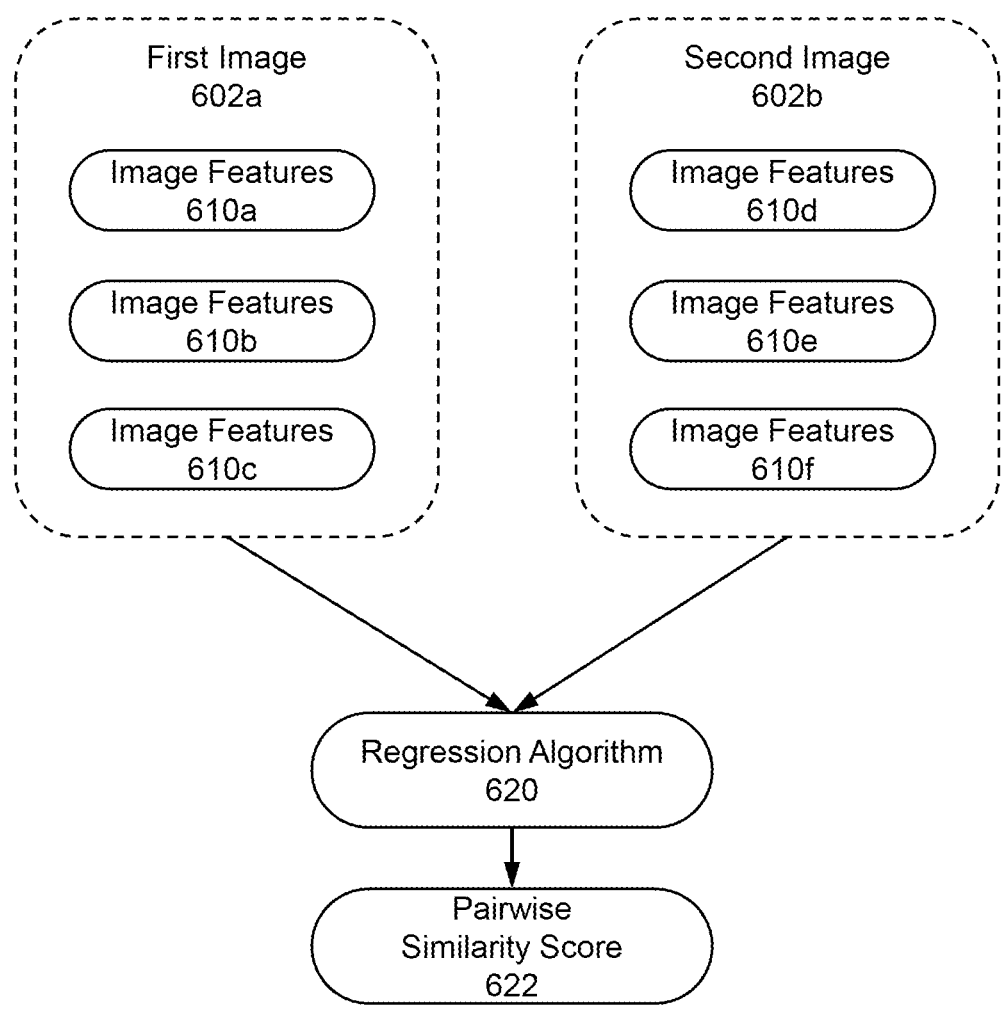
FIG. 6 illustrates data flow in a process for generating a similarity score for an image, in accordance with one or more implementations.

FIG. 6 illustrates data flow in a process 600 for generating a similarity score for an image, in accordance with one or more implementations. Additional, fewer, or different operations may be performed in process 600. In some implementations, the process 600 can be performed by the image analysis module 125 of FIG. 1. The process 600 can be used to compute pairwise similarity between a first image 602a and a second image 602b. This differs from the process 500 in that the process 500 is used to compute set similarity (i.e., similarity of a candidate image with respect to a set of training images) rather than pairwise similarity (i.e., a degree of similarity between two candidate images). The first image 602a and the second image 602b can be any images whose similarity to one another is of interest. For example, a user of one of the client computing devices 104 may submit the first image 602a and the second image 602b a similarity determination.

In some implementations, data flow for determining similarity between the first image 602a and the second image 602b can be similar to data flow for constructing the generative model 304 with each training image as described above in FIGS. 2-4. For example, a set of image features can be extracted from each of the first image 602a and the second image 602b. In some implementations, multiple sets of images can be extracted from each of the first image 602a and the second image 602b. For example, as shown in FIG. 6, three sets of image features (labeled 610a-610c) can be extracted from the first image 602a, and three sets of image features (labeled 610d-610f) can be extracted from the second image 602b. In some implementations, the image features 510 can be extracted from the candidate image 504 using the same or similar techniques described above for extracting the image features 210 from an image 202. For example, as show in FIG. 2, one or more AI models 204, one or more computer vision services 206, and other data analysis techniques 208 can be used to extract features from the candidate image 504. In some implementations, the one or more AI models 204, the one or more computer vision services 206, and the other data analysis techniques 208 may be or may include artificial neural networks having layered structures, and features may be extracted from intermediate layers of these artificial neural networks.

In some implementations, the image features 610a-610c can be represented as tensors. The dimensionality of one or more of these feature tensors can be reduced using techniques similar to those described above. In some implementations, the image features 610a-610c can be feature types or categories that correspond to the types of categories of image features 610d-610f, respectively. This can facilitate comparison of pairs of the image features 610a-610d via the regression algorithm 620. For example, the image features 610a of the first image 602a can be compared to the image features 610d of the second image 602b, the image features 610b of the first image 602a can be compared to the image features 610e of the second image 602b, and the image features 610c of the first image 602a can be compared to the image features 610f of the second image 602b.

Similar to the calculation of the similarity score 522 as shown in FIG. 5, the calculation of the pairwise similarity score 622 can be a regression problem. For example, the regression algorithm 620 can be used to compare the image features 610a-610b of the first image 602a with the image features 610c-610f, respectively, of the second image 602b. Thus, the image analysis module 125 can be configured to apply the regression algorithm 620 to compare feature tensors included in the image features 610 of the first image 602a with the corresponding image features 610 of the second image 602b. In some implementations, the regression algorithm 620 can be used to compute a distance (e.g., a geometric distance in a space defined by the image features 610) between the feature tensors included in the image features 610 of the first image 602a with the corresponding image features 610 of the second image 602b. The image analysis module 125 can calculate a pairwise similarity score 622 based on the results of the regression algorithm 620. For example, if the regression algorithm 620 indicates that the image features 610a-610c are relatively close to the image features 610d-610f, the image analysis module 125 can calculate a pairwise similarity score 622 indicating that the first image 602a is relatively similar to the second image 602b. If the regression algorithm 620 indicates that the image features 610a-610c are relatively far from the image features 610d-610f, the image analysis module 125 can calculate a pairwise similarity score 622 indicating that the first image 602a is relatively dissimilar from the second image 602b.

In some implementations, the similarity score can be a numerical value. For example, the pairwise similarity score 622 may be an integer between zero and 100, or a decimal value between 0 and 1. In some implementations, the image analysis module 125 can apply a normalization technique when calculating the pairwise similarity score 622. For example, the normalization technique can make use of a set of parameters that may be selected based on the feature types of the features 610a-610f. In some implementations, a pairwise similarity score 622 near zero may indicate a relatively high degree of similarity between the first image 602a and the second image 602b, while a pairwise similarity score 622 near 1 may indicate a relatively low degree of similarity between the first image 602a and the second image 602b.

In some implementations, the normalization technique for pairwise similarity can rely on two parameters, including an upper bound and a lower bound for the distance between the same feature tensor for the first image 602a and the second image 602b images. The value of the distance can then be normalized using the following equation: (distance between the two tensors−lower bound)/(upper bound−lower bound). In some implementations, the results can be clipped at 0 and 1, so that any distance values lower than the lower bound are set to 0 and distance higher than the upper bound are set to 1. In this example, a lower score can indicate that the first image 602a and the second image 602b are more similar for a given feature tensor, and a higher score can indicate less similarity for that feature. The upper and lower bounds can be determined, for example, by evaluating feature tensors for a large number of images for each feature.

In some implementations, server(s) 105, client computing platform(s) 110, and/or external resources 160 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 105, client computing platform(s) 110, and/or external resources 160 may be operatively linked via some other communication media.

A given client computing platform 110 may include one or more processors configured to execute computer program modules. The computer program modules may be configured to enable an expert or user associated with the given client computing platform 110 to interface with system 100 and/or external resources 160, and/or provide other functionality attributed herein to client computing platform(s) 110. By way of non-limiting example, the given client computing platform 110 may include one or more of a desktop computer, a laptop computer, a handheld computer, a tablet computing platform, a NetBook, a Smartphone, a gaming console, and/or other computing platforms.

External resources 160 may include sources of information outside of system 100, external entities participating with system 100, and/or other resources. In some implementations, some or all of the functionality attributed herein to external resources 160 may be provided by resources included in system 100.

Server(s) 105 may include electronic storage 165, one or more processors 170, and/or other components. Server(s) 105 may include communication lines, or ports to enable the exchange of information with a network and/or other computing platforms. Illustration of server(s) 105 in FIG. 1 is not intended to be limiting. Server(s) 105 may include a plurality of hardware, software, and/or firmware components operating together to provide the functionality attributed herein to server(s) 105. For example, server(s) 105 may be implemented by a cloud of computing platforms operating together as server(s) 105.

Electronic storage 165 may comprise non-transitory storage media that electronically stores information. The electronic storage media of electronic storage 165 may include one or both of system storage that is provided integrally (i.e., substantially non-removable) with server(s) 105 and/or removable storage that is removably connectable to server(s) 105 via, for example, a port (e.g., a USB port, a firewire port, etc.) or a drive (e.g., a disk drive, etc.). Electronic storage 165 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 165 may include one or more virtual storage resources (e.g., cloud storage, a virtual private network, and/or other virtual storage resources). Electronic storage 165 may store software algorithms, information determined by processor(s) 170, information received from server(s) 105, information received from client computing platform(s) 110, and/or other information that enables server(s) 105 to function as described herein.

Processor(s) 170 may be configured to provide information processing capabilities in server(s) 105. As such, processor(s) 170 may include one or more of a digital processor, an analog processor, a digital circuit designed to process information, an analog circuit designed to process information, a state machine, and/or other mechanisms for electronically processing information. Although processor(s) 170 is shown in FIG. 1 as a single entity, this is for illustrative purposes only. In some implementations, processor(s) 170 may include a plurality of processing units. These processing units may be physically located within the same device, or processor(s) 170 may represent processing functionality of a plurality of devices operating in coordination. Processor(s) 170 may be configured to execute modules 120, 125, and 130, and/or other modules. Processor(s) 170 may be configured to execute modules 120, 125, and 130, and/or 205, and/or other modules by software; hardware; firmware; some combination of software, hardware, and/or firmware; and/or other mechanisms for configuring processing capabilities on processor(s) 170. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 120, 125, and 130 are illustrated in FIG. 1 as being implemented within a single processing unit, in implementations in which processor(s) 170 includes multiple processing units, one or more of modules 120, 125, and 130 may be implemented remotely from the other modules. The description of the functionality provided by the different modules 120, 125, and 130 described below is for illustrative purposes, and is not intended to be limiting, as any of modules 120, 125, and 130 may provide more or less functionality than is described. For example, one or more of modules 120, 125, and 130 may be eliminated, and some or all of its functionality may be provided by other ones of modules 120, 125, and 130. As another example, processor(s) 170 may be configured to execute one or more additional modules that may perform some or all of the functionality attributed below to one of modules 120, 125, and 130.

Figure 7:
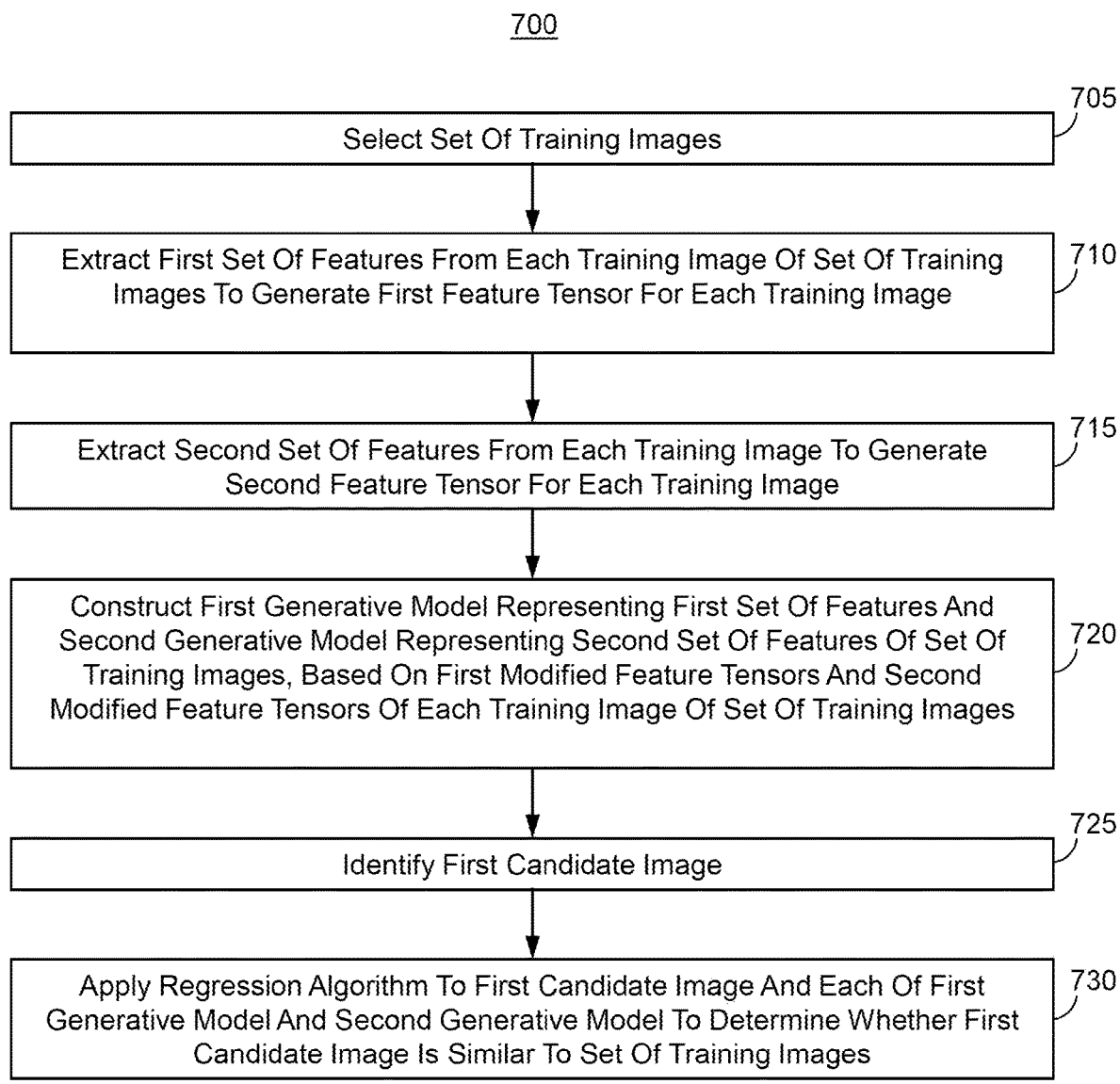
FIG. 7 illustrates a method for evaluating images, in accordance with one or more implementations.

FIG. 7 illustrates a method 700 for evaluating images, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

In some implementations, the method 700 can be used to determine a degree of similarity between a candidate image and a set of training images. An operation 705 may include selecting a set of training images. Operation 705 may be performed by one or more hardware processors configured by machine-readable instructions including the machine-readable instructions 115 and/or any of the modules implemented by the machine-readable instructions 115, in accordance with one or more implementations.

An operation 710 may include extracting a first set of features from each training image of the set of training images to generate a first feature tensor for each training image. Operation 710 may be performed by one or more hardware processors configured by machine-readable instructions including a module that is the same as or similar to feature extraction module 120, in accordance with one or more implementations.

An operation 715 may include extracting a second set of features from each training image to generate a second feature tensor for each training image. Operation 715 may be performed by one or more hardware processors configured by machine-readable instructions including a module that is the same as or similar to feature extraction module 120, in accordance with one or more implementations.

In some implementations, the method 700 may optionally include reducing a dimensionality of each first feature tensor to generate a first modified feature tensor for each training image. For example, dimensionality reduction of each first feature tensor may be performed by one or more hardware processors configured by machine-readable instructions including a module that is the same as or similar to image analysis module 125, in accordance with one or more implementations.

In some implementations, the method 700 may include reducing a dimensionality of each second feature tensor to generate a second modified feature tensor for each training image. For example, dimensionality reduction of each second feature tensor may be performed by one or more hardware processors configured by machine-readable instructions including a module that is the same as or similar to image analysis module 125, in accordance with one or more implementations.

An operation 720 may include constructing a first generative model representing the first set of features and a second generative model representing the second set of features of the set of training images, based on the first modified feature tensors and the second modified feature tensors of each training image of the set of training images. Operation 720 may be performed by one or more hardware processors configured by machine-readable instructions including a module that is the same as or similar to image analysis module 125, in accordance with one or more implementations.

An operation 725 may include identifying a first candidate image. Operation 725 may be performed by one or more hardware processors configured by machine-readable instructions including a module that is the same as or similar to image analysis module 125, in accordance with one or more implementations.

An operation 730 may include applying a regression algorithm to the first candidate image and each of the first generative model and the second generative model to determine whether the first candidate image is similar to the set of training images. Operation 730 may be performed by one or more hardware processors configured by machine-readable instructions including a module that is the same as or similar to image analysis module 125, in accordance with one or more implementations.

Figure 8:
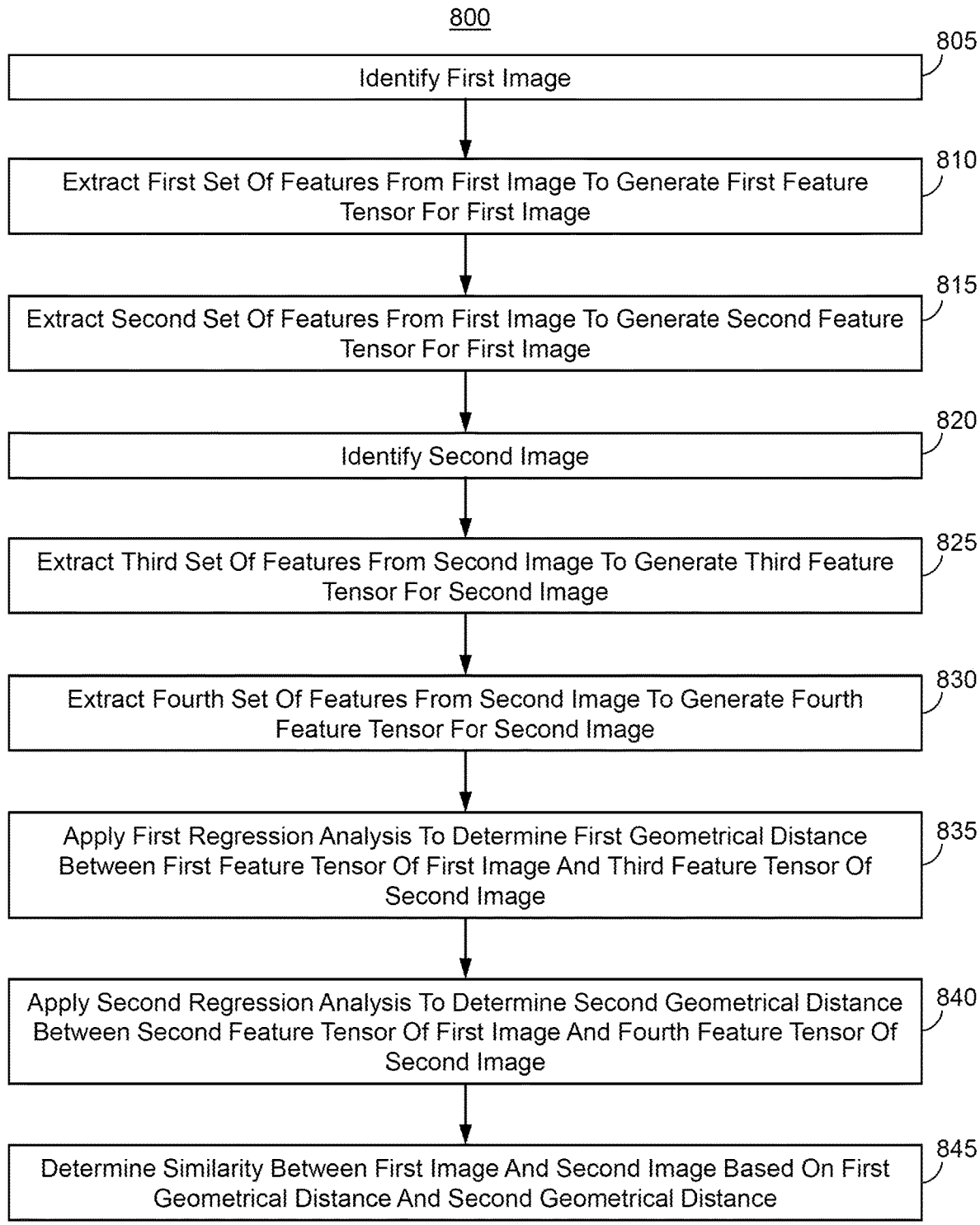
FIG. 8 illustrates a method for evaluating images, in accordance with one or more implementations.

FIG. 8 illustrates a method 800 for evaluating images, in accordance with one or more implementations. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

In some implementations, the method 800 can be used to determine a degree of similarity between a first image and a second image. An operation 805 may include identifying a first image. Operation 805 may be performed by one or more hardware processors configured by machine-readable instructions including a module that is the same as or similar to image identifying module 120, in accordance with one or more implementations.

An operation 810 may include extracting a first set of features from the first image to generate a first feature tensor for the first image. Operation 810 may be performed by one or more hardware processors configured by machine-readable instructions including a module that is the same as or similar to feature extraction module 120, in accordance with one or more implementations.

An operation 815 may include extracting a second set of features from the first image to generate a second feature tensor for the first image. Operation 815 may be performed by one or more hardware processors configured by machine-readable instructions including a module that is the same as or similar to feature extraction module 120, in accordance with one or more implementations.

An operation 820 may include identifying a second image. Operation 820 may be performed by one or more hardware processors configured by machine-readable instructions including a module that is the same as or similar to image identifying module 120, in accordance with one or more implementations.

An operation 825 may include extracting a third set of features from the second image to generate a third feature tensor for the second image. Operation 825 may be performed by one or more hardware processors configured by machine-readable instructions including a module that is the same as or similar to feature extraction module 120, in accordance with one or more implementations.

An operation 830 may include extracting a fourth set of features from the second image to generate a fourth feature tensor for the second image. Operation 830 may be performed by one or more hardware processors configured by machine-readable instructions including a module that is the same as or similar to feature extraction module 120, in accordance with one or more implementations.

An operation 835 may include applying a first regression analysis to determine a first geometrical distance between the first feature tensor of the first image and the third feature tensor of the second image. Operation 835 may be performed by one or more hardware processors configured by machine-readable instructions including a module that is the same as or similar to regression analysis applying module 130, in accordance with one or more implementations.

An operation 840 may include applying a second regression analysis to determine a second geometrical distance between the second feature tensor of the first image and the fourth feature tensor of the second image. Operation 840 may be performed by one or more hardware processors configured by machine-readable instructions including a module that is the same as or similar to regression analysis applying module 130, in accordance with one or more implementations.

An operation 845 may include determining a similarity between the first image and the second image based on the first geometrical distance and the second geometrical distance. Operation 845 may be performed by one or more hardware processors configured by machine-readable instructions including a module that is the same as or similar to similarity determination module 135, in accordance with one or more implementations.

The technology described in this disclosure for determining set-based or pairwise similarity of digital images can be implemented for a variety of purposes. For example, in an image search application, similarity scores based on visual content items can be used to find similar content items automatically to provide users with more relevant results. The approach described herein, which examines features of a variety of digital images, can allow such searches to be performed without requiring any other labels or referencing other metadata of the images. Thus, unlabeled digital images can be searched efficiently.

In a related example, image similarity can be leveraged to power new content recommendations that can be delivered to an end user. For example, on a web-based storefront product listing page, a user may wish to find a better lifestyle image to publish to make the user's products appear more visually engaging. The technology described in this disclosure can take this input image and look for the nearest matches across one or more data stores. For example, the recommended imagery could have a provenance on a stock photo site. Alternatively, a recommended image could be in a folder stored on the user's computer (e.g., in a photo gallery application executed by the computer), or it could be in a cloud-based digital asset management system or other content library, social media account, etc.

In some implementations, the technology described herein can allow a visual signature to be generated for a set of one or more images. Visual similarity provides a means to generate a visual signature for a user based upon the images in the user's photo gallery, or in a given collection of images associated with the user. For example, by selecting a set of images associated with a user and determining a visual signature of the selected set, the visual signature can also be associated with the user. Similarly, the visual signature can be associated with a website or other web-based property, an author, a social media account, etc., simply by selecting the set of images from the web-based property, the author, the social media account and determining a visual signature based on the selected set of images. The visual signature can be a unique identifier of the user and can enable comparison of one user against another user to find a visual match (e.g., visual signatures that are similar to one another, or near to one another geometrically in a space defined by features that were used to generate the visual signatures). This is advantageous because it eliminates any need to review any demographic or personal identifiable information about the users to create these such a pairing. It enables a new user graph (e.g., a social network) that can be powered by the visual connectedness between users and groups of users.

In a similar example, the similarity technology can be used as a preprocessing step before computing an identity calculation, which can be based on the visual signature of images captured by, stored by, owned by, or otherwise associated with a user. That is, the technology described herein can be used as a content classifier to find all images relating to a common theme, such as travel-related photos in the user's photo gallery application.

The visual similarity technology described herein can also be applied in the context of determining whether a given image is a "fit" with a user's chosen or preferred identity, "brand look," or other creative requirements of a user or brand. For example, a brand may have a logo that includes a distinctive green color as part of its brand identity. In their marketing and advertising promotions, this color can therefore be emphasized to build familiarity among potential customers and reinforce associations with the brand with end consumers. In an illustrative example, the technology described herein can be used to evaluate the visual features of a representative sample of imagery for the brand, and can compare new candidate images to this sample set based on their visual similarity to the brand attributes. In that way, images that may not have the same green color (or a certain prominence of green color, etc.) may be identified as visually dissimilar and therefore classified as more likely to be off-brand. For example, "off-brand" images may be inappropriate for use due to potential confusion caused by inconsistent themes in messaging.

The visual similarity technology described herein can also be an extremely efficient means to compile training sets for a particular image-based classification problem. For example, if a user wishes to build a classifier on "apple orchards," the user can submit one or more images of an apple orchard to the systems and methods of this disclosure can analyze the constituent visual features of the apple orchard seed image(s) and use these features as a basis for automatically identifying visually-similar images. This can be used to identify a set of visually similar images that can be used to train a new machine learning model, for example, without requiring the traditional heavily-manual human curation process.

In a related example, the technology described herein can be made available as a self-service option to users. With this technology, users advantageously do not need to have any deep learning or data science experience to build a dataset. For example, the system can do this work for them—they need only define the parameters on which they would like a custom content classifier to be generated. In some implementations, a user can access a system providing this functionality, such as the server 105, via a network connection to the user's computing device, such as the client computing platform 110 as shown in FIG. 1.

The technology described in this disclosure can also be utilized to generate predicted business outcomes of visual material. For example, consider a social media post where the return on investment (ROI) of taking a new photo is measured by a number of "likes" earned by the post. Given a candidate image, the technology described herein can be used to identify the most visually similar contents that have been previously posted, with respect to the candidate image. Each of these historical contents can be associated with a number of Likes. The visual similarity technology described herein can be used to evaluate the features of the candidate image with these other images (either published by the user, or e.g. published by other users, such as a competitor) and then based upon a visual similarity match to the contents that have been tagged with performance information, the technology described herein can be used to impute a predicted range of Likes for the candidate image. This is useful because it provides users with a predictive return on investment of their photo selections prior to putting them into market. This same approach can be leveraged with other forms of visual media such as advertisements, coupons, packaging designs, displays, website images, etc.

In a related example, users can select one or more images from a collection (e.g. on a mobile phone photo gallery application) to customize the content they wish to study. These selections can be used to inform subsequent contents that are shown to or flagged for the user. Advantageously, a user's selections can also form the basis for smart albums that automatically populate themselves with new contents. For example, if a user selects five images containing beer-related images the system can use these images as the reference set for identifying new images that "visually fit" with the beer-related contents. In that way, the next time a user takes a photo that relates to beer, the photo can be automatically tagged and classified into the album with visually-similar material. These albums can also be generated automatically on-device based on visual similarity without the user's customization if desired.

In another related example, the task of retrieving visually-similar content items can be performed by the end user. For example, if a user selects an image, clicks in image, or otherwise 'chooses' one or more images displayed in a photo gallery application, the technology described herein can be used to retrieve or "summon" other images that are visually similar to the user's selection. For example, the retrieved images can be based on the similarity scores with respect to the images selected by the user. Such a feature can be advantageous to quickly find the images that a user is are looking for in a disorganized space, such as photo gallery application. Visual similarity therefore enables a new suite of content management and curation features that improve user experience and enable the discoverability of new and relevant content.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system comprising:
   one or more hardware processors having machine-readable instructions to:
   select a set of training images;
   extract a first set of features from each training image of the set of training images to generate a first feature tensor for each training image;
   extract a second set of features from each training image to generate a second feature tensor for each training image;
   construct a first generative model representing the first set of features and a second generative model representing the second set of features of the set of training images, based on the first feature tensors and the second feature tensors of each training image of the set of training images;
   identify a first candidate image; and
   apply a regression algorithm to the first candidate image and each of the first generative model and the second generative model to determine whether the first candidate image is similar to the set of training images.

2. The system of claim 1, wherein the one or more hardware processors further include machine-readable instructions to:
   calculate a similarity score representing a degree of visual similarity between the first candidate image and the set of training images, based on the regression algorithm.

3. The system of claim 2, wherein the one or more hardware processors further include machine-readable instructions to:
   calculate a uniqueness score of the first candidate image with respect to the set of training images.

4. The system of claim 3, wherein calculating the uniqueness score of the first candidate image comprises:
   calculating an inverse of the similarity score; and
   identifying the inverse as the uniqueness score.

5. The system of claim 1, wherein the one or more hardware processors further include machine-readable instructions to:

extract features from the first candidate image to generate a candidate image feature tensor, the features corresponding to the first set of features extracted from each candidate image, wherein determining whether the candidate image is similar to the set of training images comprises comparing the candidate image feature tensor with the first generative model.

6. The system of claim 5, wherein the one or more hardware processors further include machine-readable instructions to:
apply a weight to the features extracted from the candidate image to generate a set of weighted candidate image features, wherein the candidate image feature tensor is generated based on the set of weighted candidate image features.

7. The system of claim 1, wherein:
the first set of features extracted from each training image comprises object features; and
wherein the one or more hardware processors are further configured by machine-readable instructions to extract the first set of features from each training image by:
propagating data corresponding to each training image through at least one neural network including at least one of an object detection neural network, an object classification neural network, or an object recognition neural network, wherein the neural network comprises an input layer, a plurality of intermediate layers, and an output layer; and
extracting outputs from at least one of the plurality of intermediate layers of the network.

8. The system of claim 1, wherein extracting the first set of features from each training image comprises extracting at least one of a set of object features, a set of scene features, a set of intensity features, a set of contrast features, a set of color features, and a set of blurriness features from each training image.

9. The system of claim 1, wherein the one or more hardware processors further include machine-readable instructions to:
identify respective locations of the first feature tensor and the second feature tensor in a feature space defined by the first set of features and the second set of features;
generate a visual signature for the set of training images based on the respective locations of the first feature tensor and the second feature tensor.

10. The system of claim 9, wherein the one or more hardware processors further include machine-readable instructions to select the set of training images based on at least one of a common author, a common origin, or a common theme.

11. The system of claim 1, wherein the one or more hardware processors further include machine-readable instructions to:
identify a set of candidate images including the first candidate image;
determine, for each candidate image of the set of candidate images, whether the candidate image is similar to the set of training images based on the first candidate image and each of the first generative model and the second generative model; and
identify a subset of the set of candidate images that are similar to the set of training images.

12. The system of claim 1, wherein the one or more hardware processors further include machine-readable instructions to:

provide a graphical user interface to be displayed on a computing device, the graphical user interface displaying a plurality of indications corresponding to the set of candidate images; and
receive a user selection of a first indication or the plurality of indications corresponding to the first candidate image.

13. The system of claim 1, wherein the one or more hardware processors further include machine-readable instructions to:
identify a brand attribute; and
select the first set of features to be extracted from the set of training images based at least in part on the brand attribute.

14. A method comprising:
selecting a set of training images;
extracting a first set of features from each training image of the set of training images to generate a first feature tensor for each training image;
extracting a second set of features from each training image to generate a second feature tensor for each training image;
constructing a first generative model representing the first set of features and a second generative model representing the second set of features of the set of training images, based on the first feature tensors and the second feature tensors of each training image of the set of training images;
identifying a first candidate image; and
applying a regression algorithm to the first candidate image and each of the first generative model and the second generative model to determine whether the first candidate image is similar to the set of training images.

15. The method of claim 14, further comprising:
calculating a similarity score representing a degree of visual similarity between the first candidate image and the set of training images, based on the regression algorithm.

16. The method of claim 15, further comprising:
calculating a uniqueness score of the first candidate image with respect to the set of training images.

17. The method of claim 16, wherein calculating the uniqueness score of the first candidate image comprises:
calculating an inverse of the similarity score; and
identifying the inverse as the uniqueness score.

18. The method of claim 14, further comprising:
extracting features from the first candidate image to generate a candidate image feature tensor, the features corresponding to the first set of features extracted from each candidate image, wherein determining whether the candidate image is similar to the set of training images comprises comparing the candidate image feature tensor with the first generative model.

19. The method of claim 18, further comprising:
applying a weight to the features extracted from the candidate image to generate a set of weighted candidate image features, wherein the candidate image feature tensor is generated based on the set of weighted candidate image features.

20. The method of claim 14, wherein extracting the first set of features from each training image comprises extracting at least one of a set of object features, a set of scene features, a set of intensity features, a set of contrast features, a set of color features, and a set of blurriness features from each training image.

* * * * *